(12) United States Patent
Van Dijk et al.

(10) Patent No.: US 7,998,456 B2
(45) Date of Patent: Aug. 16, 2011

(54) PROCESS FOR THE PRODUCTION OF HYDROGEN

(75) Inventors: Haroldus Adrianus Johannes Van Dijk, Petten (NL); Stephan Montel, Sarawak (MY); Wayne G. Wnuck, South Windsor, CT (US)

(73) Assignee: Shell Oil Company, Houston, TX (US)

( * ) Notice: Subject to any disclaimer, the term of this patent is extended or adjusted under 35 U.S.C. 154(b) by 353 days.

(21) Appl. No.: 12/447,544

(22) PCT Filed: Oct. 31, 2007

(86) PCT No.: PCT/EP2007/061725
§ 371 (c)(1),
(2), (4) Date: May 5, 2009

(87) PCT Pub. No.: WO2008/053007
PCT Pub. Date: May 8, 2008

(65) Prior Publication Data
US 2010/0061921 A1    Mar. 11, 2010

(30) Foreign Application Priority Data

Oct. 31, 2006    (EP) .................................. 06123282

(51) Int. Cl.
*C01B 3/26* (2006.01)
*B01J 38/14* (2006.01)
(52) U.S. Cl. .................... 423/648.1; 252/373; 423/650; 423/651; 502/38

(58) Field of Classification Search .................. 423/651, 423/650, 648.1; 252/373; 502/38, 39
See application file for complete search history.

(56) References Cited

U.S. PATENT DOCUMENTS

| | | | |
|---|---|---|---|
| 2,473,525 A | 6/1949 | Hoop | 252/373 |
| 2,873,173 A | 2/1959 | Neumeyer | 23/281 |
| 6,486,087 B1 | 11/2002 | Saling et al. | 502/38 |
| 7,005,455 B2 | 2/2006 | Cnossen et al. | 518/700 |
| 7,524,786 B2 * | 4/2009 | Wang et al. | 502/38 |
| 7,824,574 B2 * | 11/2010 | White et al. | 252/373 |
| 2004/0033885 A1 * | 2/2004 | Wang et al. | 502/38 |

* cited by examiner

*Primary Examiner* — Wayne Langel

(57) ABSTRACT

The present invention provides a process for the production of hydrogen from the catalytic partial oxidation of a hydrocarbonaceous feedstock (3) with molecular oxygen (4) over a partial oxidation catalyst (6), which process comprises: during a reaction time interval contacting a first mixture of the hydrocarbonaceous feedstock and molecular oxygen with an overall oxygen-to-carbon ratio in the range of from 0.3 to 0.8 with the partial oxidation catalyst to convert the feedstock to a hydrogen-comprising gas and during a regeneration time interval contacting a second mixture of the hydrocarbonaceous feedstock and molecular oxygen with an oxygen-to-carbon ratio in the range of from 1.0 to 10 with the partial oxidation catalyst, in which process the regeneration time interval is in the range of from 2 to 10 seconds and the ratio of the reaction time interval to the regeneration time interval is at most 40.

14 Claims, 1 Drawing Sheet

US 7,998,456 B2

PROCESS FOR THE PRODUCTION OF HYDROGEN

The present application claims priority from European Patent Application 06123282.3 filed 31 Oct. 2006.

FIELD OF THE INVENTION

The present invention provides a process for the production of hydrogen.

BACKGROUND OF THE INVENTION

Hydrogen can be produced by means of fuel processing. In a fuel processor, a hydrocarbonaceous fuel is converted into a hydrogen-rich gas stream that may for instance be used in a fuel cell for the generation of electricity.

Typically in a fuel processor, the hydrocarbonaceous fuel is reacted with oxygen and/or steam by means of catalytic partial oxidation, autothermal reforming, steam reforming or a combination of one or more thereof to obtain a gas mixture comprising carbon oxides and hydrogen.

During operation the catalyst may be deactivated. Such a deactivation of the catalyst may be induced by any number of mechanisms, including coking, poisoning and reduction. Consequently, fuel conversion and hydrogen yield decrease and periodic replacement or regeneration of the catalyst is necessary. Typical catalyst used in for instance catalytic partial oxidation and steam-reforming processes comprise Group VIII noble metals. Such metals are expensive and therefore it is desirable to regenerate the catalyst rather than replacing it.

A known method for regeneration of a catalyst is oxidative regeneration. U.S. Pat. No. 7,005,455 discloses a method for in-situ regenerating a partial oxidation catalyst. In the method of U.S. Pat. No. 7,005,455 the catalyst is regenerated by passing a gas over a deactivated catalyst that restores the active surface area of the catalytic metals, which was lost from deactivation phenomena. In one embodiment of U.S. Pat. No. 7,005,455 a single syngas reactor is operated in cyclic mode in which the reactor alternates between reaction and regeneration operating conditions. It is disclosed in U.S. Pat. No. 7,005,455 that once deactivation of the catalyst is detected, a regeneration gas replaces reactant feedstock to the reactor. Reactivation will take place for a period of time sufficient to restore activity of the catalyst. It is suggested in U.S. Pat. No. 7,005,455 that independent of the catalyst deactivation the catalyst is reactivated for three hours per week. During this period the reactor produces no hydrogen.

There is a need in the art for a process for producing hydrogen, which will enable a regular supply of hydrogen without the need for prolonged shutdown periods and the need for separate regeneration gases.

SUMMARY OF THE INVENTION

The present invention provides an improved process for the production of hydrogen.

A catalytic partial oxidation process may be operated without significant loss of catalyst activity by periodically switching from partial oxidation conditions to complete oxidation conditions.

Accordingly, the present invention provides a process for the production of hydrogen from the catalytic partial oxidation of a hydrocarbonaceous feedstock with molecular oxygen over a partial oxidation catalyst, which process comprises:

during a reaction time interval, contacting a first mixture of the hydrocarbonaceous feedstock and molecular oxygen with an overall oxygen-to-carbon ratio in the range of from 0.3 to 0.8 with the partial oxidation catalyst to convert the feedstock to a hydrogen-comprising gas and during a regeneration time interval, contacting a second mixture of the hydrocarbonaceous feedstock and molecular oxygen with an oxygen-to-carbon ratio in the range of from 1.0 to 10 with the partial oxidation catalyst, in which process the regeneration time interval is in the range of from 2 to 10 seconds and the ratio of the reaction time interval to the regeneration time interval is at most 40.

The process according to the invention allows for prolonged active catalyst life, thereby reducing downtime needed for reactivation or exchange of the catalyst. Furthermore, the process according to the invention enables a regular supply of hydrogen. It has further been found that with the process according to the invention, the feedstock conversion and hydrogen yield are improved compared to steady state operation of the process.

Furthermore, in the process according to the invention, there is no need to provide separate regeneration gases during the period of time in which the process is operated under complete oxidation conditions (regeneration time interval). Regeneration is achieved by changing the oxygen-to-carbon ratio in the mixture of feedstock and molecular oxygen that is brought into contact with the catalyst.

DETAILED DESCRIPTION OF THE INVENTION

Figure 1:
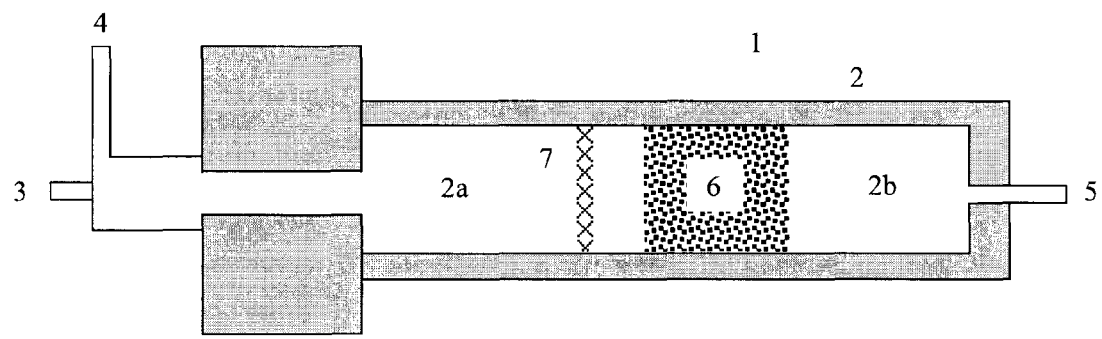
FIG. 1 schematically shows a catalytic partial oxidation processor suitable for the process according to the present invention.

The process according to the present invention is a process for the production of hydrogen. The hydrogen is produced during a reaction time interval, wherein a hydrocarbonaceous feedstock is converted to a hydrogen-comprising gas using a catalytic partial oxidation process. During this interval the feedstock is mixed with an amount of molecular oxygen to form a first mixture with an overall oxygen-to-carbon ratio in the range of from 0.3 to 0.8. Reference herein to oxygen-to-carbon ratio is to the ratio of oxygen molecules ($O_2$) mixed with the feedstock and carbon atoms in the feedstock. The first mixture is contacted with a partial oxidation catalyst and the feedstock is catalytically partially oxidised to obtain a hydrogen-comprising gas. Such gas may further comprise carbon monoxide and/or carbon dioxide. A side effect of the partial oxidation reaction is the catalyst deactivation. A by-product of the partial oxidation reaction may be a carbon-comprising residue, which is deposited on the catalyst surface. Catalyst deactivation may for instance be characterized by the rate of decrease in hydrogen and carbon monoxide yield, $n_{(CO+H2)}$, during a set time interval or $$\text{Rate of deactivation} = \frac{\frac{n_{(CO+H2), t=t_n+\Delta t} - n_{(CO+H2), t=t_n}}{n_{(CO+H2), t=t_n}} \times 100\%}{\Delta t} \; [\%/\text{min}]. \quad (1)$$

The rate of deactivation should not exceed −0.0015%/min.

During a regeneration time interval the feedstock is mixed with an amount of molecular oxygen to form a second mixture with an oxygen-to-carbon ratio in the range of from 1.0 to 10. By increasing the oxygen-to-carbon ratio in the second mixture above the stoichiometric oxygen-to-carbon ratio, the catalyst is contacted with the mixture comprising the feedstock and molecular oxygen under complete oxidation conditions rather than partial oxidation conditions. Without being bound to any particular theory with respect to the regeneration mechanisms, it is suggested that by exposing the catalyst to conditions of complete oxidation, the catalyst is, at least partially, regenerated. For instance, the catalyst may be regenerated by the oxidation of carbon comprising residues, which were deposited on the catalyst during the partial oxidation in the reaction time interval.

The regeneration time interval must be in the range of from 2 to 10 seconds, preferably, of from 2 to 5 seconds. By limiting the length of the regeneration time period substantial cooling of the catalyst is prevented.

In the process according to the invention the ratio of the reaction time interval to the regeneration time interval is at most 40, preferably in the range of from 1 to 40, more preferably of from 1 to 30. For longer on-periods, the decay of the catalyst activity overrules the effect of regeneration due to the oxidation conditions. Longer on-periods may also lead to the build up of significant carbon depositions, which would result in a undesired rate of deactivation.

Preferably, a sequence comprising the reaction time interval and the regeneration time interval is repeated one or more times, more preferably the sequence of reaction time interval and the regeneration time interval is repeated continuously. By repeating the sequence of the reaction time interval and the regeneration time interval a regular supply of hydrogen is provided.

Preferably, the second mixture of the feedstock and molecular oxygen may have an oxygen-to-carbon ratio in the range of from 2 to 5. Preferably, the second mixture comprises oxygen in excess of the stoichiometric ratio. The exothermic oxidation of the feedstock may provide heat to the catalyst during the regeneration time interval. In addition, the presence of oxygen in excess of the stoichiometric ratio will allow the oxidative removal of carbon-comprising residues, which may be present on the catalyst surface.

Preferably, the catalyst is contacted with the second mixture directly following the step of contacting the catalyst with the first mixture. During the regeneration time interval complete oxidation reactions take place, which generate heat. As a consequence, even when the first and second mixtures are introduced to the catalyst at relatively low temperatures, no significant cooling of the catalyst takes place.

During the reaction time interval, the catalyst is exposed to the heat generated by the exothermic partial oxidation reaction. As a consequence the temperature of the catalyst may have reached temperatures in the range of from 700 to 1500° C. When contacted with such a hot catalyst surface, the second mixture comprising molecular oxygen and feedstock may ignite spontaneously. Preferably, however, a second mixture is ignited prior to contacting the catalyst. Ignition is effected e.g. by a spark igniter or a glow element.

The hydrocarbonaceous feedstocks that are suitable for the process according to the invention include gaseous and liquid feedstocks. Where gaseous feedstocks generally mix easily with the molecular oxygen, it may be preferred that the liquid feedstock is first evaporated. The heat necessary to evaporate the feedstock may be provided by the molecular oxygen-comprising gas. If the temperature of the molecular oxygen-comprising gas is high enough, it may be used to cause the feedstock to evaporate when it is contacted or mixed with the molecular oxygen-comprising gas. Alternatively, part of the feedstock may be combusted to generate the heat necessary for evaporating the feedstock. Accordingly, liquid feedstock is mixed in the reaction time interval with a first part of the molecular oxygen to form an intermediate mixture comprising feedstock and molecular oxygen. Then, the intermediate mixture is ignited, causing the feedstock to react exothermically with the molecular oxygen. The heat generated by the exothermic reaction causes the feedstock in the intermediate mixture to evaporate.

The evaporated feedstock is then mixed with a second part of the molecular oxygen, to form the first mixture comprising evaporated feedstock and molecular oxygen.

It is preferred that during the exothermic reaction between the feedstock and the first part of the molecular oxygen only the heat required for the evaporation of the feedstock is generated. Therefore, the oxygen-to-carbon ratio in the intermediate mixture is preferably in the range of from 0.01 to 0.4, more preferably of from 0.01 to 0.15, even more preferably of from 0.02 to 0.10.

The overall oxygen-to-carbon ratio in the first mixture is in the range of from 0.3 to 0.8, preferably of from 0.40 to 0.75, more preferably of from 0.45 to 0.65.

It will be clear that the oxygen-to-carbon ratio in the intermediate mixture cannot exceed the overall oxygen-to-carbon ratio of the first mixture. Preferably, the oxygen-to-carbon ratio in the intermediate mixture does not exceed 50% of the overall oxygen-to-carbon ratio. Therefore, preferably, the intermediate mixture comprises no more than half of the amount of molecular oxygen.

The molecular oxygen-containing gas may comprise water. It will be appreciated that depending on the temperature the water will either be in a liquid or vapour phase. The overall water-to-carbon ratio is preferably in the range of from 0.0 to 3.0, more preferably of from 0.0 to 1.5, even more preferably of from 0.0 to 1.0. Reference herein to the overall water-to-carbon ratio is to the ratio of water molecules mixed with the feedstock and carbon atoms in the feedstock.

The process according to the invention is especially suitable for mixing the feedstock with molecular oxygen that has a temperature up to 400° C. In that case, the heat comprised in the molecular oxygen is not sufficient to evaporate the feedstock. It is preferred that the amount of the molecular oxygen mixed with the feedstock has a temperature in a range of from ambient to 500° C., more preferably in the range of from 200° C. to 500° C.

The first mixture is preferably contacted with the catalyst at a gas hourly space velocity in the range of from 1,000 to 10,000,000 Nl/l/h (normal liters of gaseous feed mixture per liter of catalyst per hour), preferably in the range of from 5,000 to 2,000,000 Nl/l/h, even more preferably in the range of from 10,000 to 1,000,000 Nl/l/h. Reference herein to normal liters is to liters at Standard Temperature and Pressure conditions, i.e. 0° C. and 1 atm.

The first mixture and/or second mixture are preferably contacted with the catalyst at a pressure up to 100 bara, preferably in the range of from 1 to 50 bara, more preferably of from 1 to 10 bara.

The catalyst may be any catalyst suitable for catalytic partial oxidation. Such catalysts are known in the art and typically comprise one or more metals selected from Group VIII of the Periodic Table of the Elements as catalytically active material on a catalyst carrier.

Suitable catalyst carrier materials are well known in the art and include refractory oxides, such as silica, alumina, titania, zirconia and mixtures thereof, and metals. Preferred refractory oxides are zirconia-based, more preferably comprising at least 70% by weight zirconia, for example selected from known forms of (partially) stabilised zirconia or substantially pure zirconia. Most preferred zirconia-based materials comprise zirconia stabilised or partially-stabilised by one or more oxides of Mg, Ca, Al, Y, La or Ce. Preferred metals are alloys, more preferably alloys containing iron, chromium and aluminium, such as fecralloy-type materials.

Preferably, the catalytically active material comprises one or more Group VIII noble metals, more preferably rhodium, iridium, palladium and/or platinum, even more preferably rhodium and/or iridium. Typically, the catalyst comprises the catalytically active material in a concentration in the range of from 0.02 to 10% by weight, based on the total weight of the catalyst, preferably in the range of from 0.1 to 5% by weight. The catalyst may further comprise a performance-enhancing inorganic metal cation selected from Al, Mg, Zr, Ti, La, Hf, Si, Ba, and Ce which is present in intimate association supported on or with the catalytically active metal, preferably a zirconium cation.

Any suitable igniter known in the art may be used to ignite the second mixture and/or the intermediate mixture. For instance, the second mixture and/or the intermediate mixture are ignited using a spark plug that is placed in the flow path of the mixture. Suitable spark plugs are typically operated at a voltage in a range from 9 to 13 Volt, which is sufficient to ignite the mixture. Alternatively, the second mixture and/or the intermediate mixture are ignited using glow element, which reaches into the mixture. A suitable glow element is for instance an electrical resistor comprising a metal spiral. Such a glow element may be powered at 12 V and 17 A, constituting a power output of approximately 200 W. Optionally, the metal spiral is coated with an oxidation catalyst.

In particular, when a liquid hydrocarbonaceous feedstock is used, it is preferred that the feedstock is mixed with the molecular oxygen in a nozzle to form a spray of the intermediate mixture and/or second mixture. Such a spray is advantageous as the evaporation of the feedstock is accelerated due to the large surface area of the feedstock droplets comprised in the spray. A suitable nozzle is for instance an air-assisted nozzle.

Suitable hydrocarbonaceous feedstocks for the process according to the invention comprise hydrocarbons, oxygenates or mixtures thereof. Oxygenates are defined as molecules containing in addition to carbon and hydrogen atoms at least one oxygen atom, which is linked to either one or two carbon atoms or a carbon atom and a hydrogen atom. Examples of suitable oxygenates are alcohols such as methanol, ethanol or dimethyl ether, aldehydes, ketones and the like. Preferably, the hydrocarbonaceous feedstock is a hydrocarbon comprising feedstock such as natural gas, liquefied petroleum gas, gasoline or diesel. Suitably, the hydrocarbonaceous feedstock may be a liquid hydrocarbonaceous feedstock. Reference herein to a liquid hydrocarbonaceous feedstock is to a feedstock that is liquid at 20° C. and atmospheric pressure. Preferably, such a liquid feedstock has a final boiling point up to 400° C., more preferably in the range of from 250 to 400° C. Examples of suitable feedstocks for use in the process according to the invention are gasoline, naphtha, or diesel feedstocks, preferably diesel feedstocks. Diesel feedstocks typically comprise at least 90% (v/v) hydrocarbons with carbon numbers in the range of from $C_{10}$-$C_{28}$, preferably $C_{12}$-$C_{24}$, more preferably $C_{12}$-$C_{15}$.

The molecular oxygen may be comprised in any suitable molecular oxygen-containing gas known in the art. Preferably, the molecular oxygen mixture is comprised in air, exhaust gas or a mixture thereof, preferably the exhaust gas is diesel exhaust gas. Reference herein to diesel exhaust gas is to the exhaust gas generated by an internal combustion engine running on diesel feedstock. It will be appreciated that a molecular oxygen-containing gas like diesel exhaust gas will typically already comprise water. It will be further appreciated that the molecular oxygen-comprising gas may be different depending on when and where it is supplied.

It will be appreciated that the hydrogen-comprising gas obtained with the present invention may be fed e.g. to an absorber for hydrogen sulphide or undergo one or more water-gas shift conversions, e.g. low or high temperature water-gas shifts, followed by preferential oxidation of carbon monoxide in the hydrogen comprising gas.

DETAILED DESCRIPTION OF THE FIGURES

FIG. 1 schematically shows catalytic partial oxidation processor 1 suitable for the process according to the present invention. Processor 1 comprises housing 2. Housing 2 contains sections 2a, for mixing feedstock and molecular oxygen-comprising gas and 2b for collection of the hydrogen-comprising gas. Housing 2 further comprises inlet 3 for supplying feedstock and inlet 4 for supplying molecular oxygen-comprising gas and outlet 5 for the hydrogen-comprising gas. Partial oxidation catalyst 6 is disposed in housing 2 on the intersection between sections 2a and 2b. Igniter 7, for example a glow element is located upstream from catalyst 6.

Figure 2:
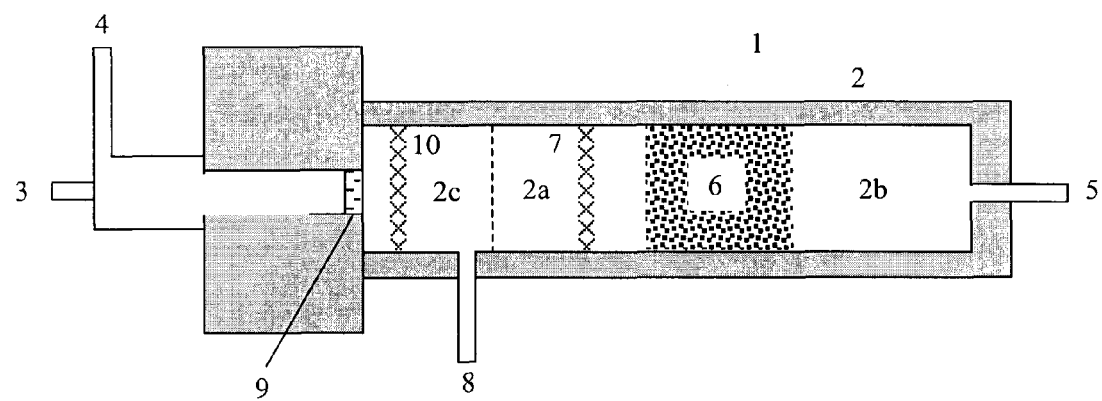
FIG. 2 schematically shows another catalytic partial oxidation processor suitable for the process according to the present invention.

FIG. 2 schematically shows a catalytic partial oxidation processor suitable for processing a liquid feedstock. Housing 2 now further comprises a section 2c for evaporating the liquid feedstock. Section 2c comprises additional inlet 8 for supplying molecular oxygen-comprising gas. Optionally, air-assisted nozzle 9 may be present to introduce the liquid feedstock and the molecular oxygen-comprising gas into section 2c. Igniter 10, for example a spark plug or a glow element is located upstream from inlet 8.

EXAMPLES

The invention is further illustrated by the following non-limiting examples.

Example 1

A diesel fuel (ARCO Ultra Low Sulphur Diesel #2) was converted to a hydrogen-comprising gas over a catalyst. Molecular oxygen was supplied comprised in a gas (exhaust gas) with a composition, which resembles diesel exhaust gas, the composition is shown in table 1. The decay of the average hydrogen concentration in the product gas was followed during the on-period (reaction time interval). During the on-period, diesel fuel and exhaust gas were supplied to the catalyst with an oxygen-to-carbon ratio of 0.53[–]. During the off-period (regeneration time interval) the catalyst was contacted with a mixture of diesel and exhaust gas having an oxygen-to-carbon ratio of 3.7[–]. During the off-period the mixture was ignited using a glow element powered at 7 V and 17 A. The gas inlet temperature was 125° C. and the fuel was in the vapour phase.

Table 2 shows the observed rate of decay for the average hydrogen concentration in the product gas for different off-period and on/off ratio. Where in Table 2 the rate of decay is positive, an improvement of the average hydrogen concentration in the product gas was observed.

TABLE 1

| Compound | Content [% wt] |
|---|---|
| $O_2$ | 13.4 |
| $H_2O$ | 4.9 |
| $CO_2$ | 4.6 |
| $N_2$ | 77.1 |

TABLE 2

| Off-period [s] | Ratio on/off [—] | Rate of decay [$\%_{abs}$/min] |
|---|---|---|
| 5 | 11 | −0.0003 |
| 5 | 23 | +0.0023 |
| 5 | 35 | −0.0015 |
| 2 | 29 | −0.0007 |
| 2 | 29 | +0.0006 |
| 2* | 59 | −0.0018 |
| 2* | 89 | −0.0025 |
| 1* | 29 | −0.0027 |
| 1* | 59 | −0.0073 |

*not according to the invention

Example 2

A diesel fuel (ARCO Ultra Low Sulphur Diesel #2) was converted to a hydrogen-comprising gas over a partial oxidation catalyst. The duration of the on-period (reaction time interval) was 180 seconds. Diesel fuel and exhaust gas were supplied to the catalyst with an oxygen-to-carbon ratio of 0.53. The duration of the off-period (regeneration time interval) was 5 seconds. During the off-period the catalyst was contacted with a mixture of diesel and exhaust gas having an oxygen-to-carbon ratio of 3.7. Prior to contacting the catalyst, the mixture was ignited using a glow element powered at 8 V and 17 A.

For a period of 90 minutes, a hydrogen-comprising gas was produced following a process according to the invention and a steady state process, i.e. continuous partial oxidation. The mixture of diesel and exhaust gas was introduced at a temperature of 125° C. In Table 3, the obtained values for the hydrogen yield and diesel conversion are reported. It will be clear form table 3 that the process according to the invention, i.e. on/off operation, shows an improved catalyst performance compared to a steady state operation.

TABLE 3

| | On/Off operation | | Steady state operation* | |
|---|---|---|---|---|
| Time [min] | Diesel conversion [%] | Hydrogen yield [$mol_{syngas}/gr_{fuel}$] | Diesel conversion [%] | Hydrogen yield [$mol_{syngas}/gr_{fuel}$] |
| 0 | 88.9 | 0.105 | 88.9 | 0.105 |
| 90 | 89.7 | 0.106 | 87.4 | 0.102 |

*not according to the invention

What is claimed is:

1. A process for the production of hydrogen from the catalytic partial oxidation of a hydrocarbonaceous feedstock with molecular oxygen over a partial oxidation catalyst, which process comprises:
contacting a first mixture of the hydrocarbonaceous feedstock and molecular oxygen with an overall oxygen-to-carbon ratio in the range of from 0.3 to 0.8 with the partial oxidation catalyst to convert the feedstock to a hydrogen-comprising gas during a reaction time interval; and
contacting a second mixture of the hydrocarbonaceous feedstock and molecular oxygen with an oxygen-to-carbon ratio in the range of from 1.0 to 10 with the partial oxidation catalyst during a regeneration time interval,
in which process the regeneration time interval is in the range of from 2 to 10 seconds and the ratio of the reaction time interval to the regeneration time interval is at most 40.

2. A process according to claim 1, wherein a sequence comprising the reaction time interval and the regeneration time interval is repeated one or more times.

3. A process according to claim 1, wherein the ratio of the reaction time interval over the regeneration time interval is in the range of from 1 to 30.

4. A process according to claim 1, wherein the regeneration time interval is in the range of 2 to 5 seconds.

5. A process according to claim 1, wherein the second mixture is ignited prior to contacting the partial oxidation catalyst.

6. A process according to claim 1, wherein the feedstock is a liquid hydrocarbonaceous feedstock.

7. A process according to claim 1, wherein the feedstock has a final boiling point up to 400° C.

8. A process according to claim 6, wherein in the reaction time interval the liquid hydrocarbonaceous feedstock is evaporated by mixing the feedstock with a first part of the molecular oxygen to form an intermediate mixture comprising feedstock and molecular oxygen and igniting the intermediate mixture.

9. A process according to claim 8, wherein the oxygen-to-carbon ratio in the intermediate mixture is in the range of from 0.01 to 0.4.

10. A process according to claim 1, wherein the overall oxygen-to-carbon ratio in the reaction time interval is in the range of from 0.40 to 0.75.

11. A process according to claim 1, wherein the oxygen-to-carbon ratio in the regeneration time interval is in the range of from 2 to 5.

12. A process according to claim 8, wherein the oxygen-to-carbon ratio in the intermediate mixture is in the range of from 0.01 to 0.15.

13. A process according to claim 8, wherein the oxygen-to-carbon ratio in the intermediate mixture is in the range of from 0.02 to 0.10.

14. A process according to claim 1, wherein the overall oxygen-to-carbon ratio in the reaction time interval is in the range of from 0.45 to 0.65.

* * * * *